US012750273B2

(12) United States Patent
Rodriguez et al.

(10) Patent No.: US 12,750,273 B2
(45) Date of Patent: Sep. 29, 2026

(54) INTEGRATION OF USER EQUIPMENT INTERNAL DATA AND USER EQUIPMENT SYSTEM REPORTS IN COMMUNICATION OPERATION EVALUATIONS

(71) Applicant: Boost SubscriberCo L.L.C., Englewood, CO (US)

(72) Inventors: Oscar Leonardo Rodriguez, Littleton, CO (US); Omar Ricardo Amaya Gonzalez, Littleton, CO (US); David Ricardo Bentolila, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 115 days.

(21) Appl. No.: 18/951,783

(22) Filed: Nov. 19, 2024

(65) Prior Publication Data

US 2026/0142868 A1 May 21, 2026

(51) Int. Cl.
*H04L 41/0631* (2022.01)
*H04L 41/0816* (2022.01)

(52) U.S. Cl.
CPC ...... *H04L 41/0631* (2013.01); *H04L 41/0816* (2013.01)

(58) Field of Classification Search
CPC . H04L 41/06; H04L 41/0631; H04L 41/0654; H04L 41/0816
See application file for complete search history.

(56) References Cited

U.S. PATENT DOCUMENTS

| | | | | |
|---|---|---|---|---|
| 2022/0052916 | A1* | 2/2022 | Fedida | G06F 11/3409 |
| 2023/0308374 | A1* | 9/2023 | Wang | H04L 45/48 |
| 2024/0007342 | A1* | 1/2024 | Gupta | H04L 41/16 |
| 2025/0385828 | A1* | 12/2025 | So | H04L 41/0631 |

* cited by examiner

*Primary Examiner* — Boris D Grijalva Lobos
(74) *Attorney, Agent, or Firm* — Kilpatrick Townsend & Stockton LLP

(57) ABSTRACT

An apparatus comprises a memory and a processor communicatively coupled to one another. The processor is configured to receive internal data associated with a communication device and receive a system communication from the communication device, determine one or more connections between the telemetry data and the discrepancies, and evaluate the one or more connections in accordance with multiple communication conditions of the one or more communication conditions to determine multiple modifications for an access communication in response to determining the one or more connections between the telemetry data and the discrepancies. The processor may be configured to generate the access communication comprising the modifications, determine one or more resolution paths for each modification of the modifications, and transmit the resolution paths to the communication device. Each resolution path comprises one or more modification commands configured to modify configuration data in the communication device.

20 Claims, 5 Drawing Sheets

INTEGRATION OF USER EQUIPMENT INTERNAL DATA AND USER EQUIPMENT SYSTEM REPORTS IN COMMUNICATION OPERATION EVALUATIONS

TECHNICAL FIELD

The present disclosure relates generally to integration operations performed in a communication network, and more specifically to a system and method configured to perform integration of user equipment internal data and user equipment system reports in communication operation evaluations.

BACKGROUND

In a conventional communication system, user devices may undergo communication interruptions where data cannot be exchanged between one or more additional user devices. These user devices may experience communication interruptions due to a disconnect between communication towers (e.g., base stations) in a communication path. For example, a user device communicating with a communication network may be unable to exchange data with the communication network if one or more communication towers in a chain of communication nodes goes under a maintenance procedure. Further, the user devices may experience communication interruptions due to deteriorating communication capabilities at the user device. For example, a user device communicating with a communication network may be unable to exchange data with the communication network if the user device is unable to perform one or more uplink operations to start a communication session with a communication tower and/or any other device associated with the communication network.

SUMMARY OF THE DISCLOSURE

In conventional communication systems, disconnects and/or interruptions of services may cause user equipment to be unable to access network resources for several hours. As operation centers rely on data monitored by base stations, the operation centers may not be able to identify root causes of the disconnects and/or interruptions that involve user equipment-level errors for long periods of time. Further, there may not be any visibility on a number of user equipment undergoing disconnects and/or interruptions of system in any specific area. In situations where a specific user equipment experiences lower quality of communication operations, a user associated with the specific user equipment may be required to bring the specific user equipment to a point of service (e.g., store, service location, and the like) where a technician may be able to diagnose any issues associated with the user equipment.

In one or more embodiments, a system and method disclosed herein are configured to proactively, and/or dynamically diagnose, evaluate, monitor, and/or update user equipment without requiring user intervention. Further, the system and method disclosed herein are configured to inhibit, prevent, and/or eliminate disconnects and/or interruptions of service for extended periods of time. To achieve the above, the system integrates user equipment internal data and user equipment system reports in communication operation evaluations in which the system is configured to determine whether the user equipment operates in accordance with one or more target metrics. The user equipment internal data may be information received from a specific user equipment configured to reference telemetry data in the specific user equipment. The user equipment system reports may be information received from a specific user equipment configured to reference one or more discrepancies in one or more communication operations performed by the user equipment. Herein, the system is configured to determine one or more connections (e.g., correlated relations) between the telemetry data and the one or more discrepancies. In some embodiments, the system may be configured to evaluate each of the connections against one or more communication conditions. The communication conditions may be one or more dynamic and/or static area status parameters referencing external influences in a predefined area surrounding the specific user equipment. The system may be configured to generate one or more configuration modifications to resolve, inhibit, prevent, reduce, and/or eliminate one or more of the discrepancies in the communication network. The system may be configured to determine one or more resolution paths for each modification. Each resolution path may comprise one or more modification commands configured to modify configuration data in the specific user equipment to resolve, inhibit, prevent, reduce, and/or eliminate the discrepancies. At this stage, the system may be configured to transmit the resolution paths to the specific user equipment for implementation at the specific user equipment. In turn, the specific user equipment may be configured to broadcast to the system whether the resolution paths were locally implemented and/or executed.

In one or more embodiments, the systems and methods described herein are integrated into a practical application to dynamically obtain different types of user equipment information from one or more user equipment, determine correlations between multiple data layers comprised in the user equipment information, and determining resolution paths to resolve, inhibit, prevent, reduce, and/or eliminate communication inefficiencies found in the one or more specific user equipment. In particular, the system and method are integrated into a practical application of aggregating multiple different types of data reports (e.g., comprising different formats) associated with a user equipment to determine a status of communication operations in an area surrounding the user equipment and/or at the user equipment. Herein, the system is configured to receive, structure, and evaluate different types of data that may be unrelated to one another at the source (e.g., the user equipment may not collect these different data types using similar operations). As part of the evaluation process, the system transforms the received data into a common format, analyzes the contents of each of the different data types, and draws connections between the one or more data types. Once connections are made between the different data types, the status of communication operations at the user equipment may be understood at a higher level of granularity. For example, the connections may correlate lower-than-expected user equipment antenna transmission performance with deficient power storage. In cases where the system is configured to receive multiple different data types for several user equipment in an area, the system may be configured to compare connections between two or more user equipment to determine system-wide interruptions and/or error patterns in the communication network.

As the connections between the different data types are determined, the system and method are integrated into a practical applications of dynamically reconfiguring and/or configuring user equipment after determining one or more communication errors in one or more user equipment within a predefined area by dynamically generating resolution paths configured to resolve, inhibit, prevent, reduce, and/or eliminate discrepancies and/or interruptions of services in the one or more user equipment. Herein, the system may be configured to determine root causes of any disconnections and/or interruptions across one or more user equipment based on evaluations performed on the received data. After the root causes are identified, the system is configured to generate proposed solutions in the form of resolution paths configured to systematically solve, reduce, and/or eliminate discrepancies in data operations across one or more user equipment. The resolution paths may be pushed as updates to the user equipment for implementation.

In addition, the systems and methods described herein comprise a technical advantage of increasing processing speeds and save processing resources in a computer system. Herein, one or more processors associated with the system are configured to dynamically reduce, inhibit, and/or eliminate adverse impacts associated with user equipment service interruptions in a communication network by inhibiting, reducing, and/or eliminating downtime caused by user equipment-level errors and/or network-wide communication interruptions. In particular, processing speeds are improved in the one or more processors as the system proactively searches for points of failure in current user equipment configuration instead of spending resources on reactionary operations that may lead to additional connectivity failures. If a possible point of failure is detected at the user equipment-level, an update correcting this point of failure may be generated. Herein, as the user equipment dynamically receives solutions to correct possible points of failure, processing resources at the user equipment are not diverted to attempt reconnection operations and communication operations performed by the user equipment are not interrupted. Further, the system is configured to generate one or more resolution paths comprising configuration and/or reconfiguration updates for the user equipment to be implemented in a manner that maintains current communication operations performed by user equipment. In this regard, updates received in the resolution paths may be implemented in accordance with a roadmap and/or a plan that reduces downtime at the user equipment while adjusting configurations to prevent interruptions of service. For example, the resolution paths may comprise a shorter update that inhibits interruption of service during a predefined period of time that may be implemented while the user equipment is operational (e.g., hot fix) and a longer update that implements one or more modifications to ongoing, existing, and/or future communication operations to reduce and/or inhibit service interruptions in the communication network over a predefined maintenance window. In some embodiments, the system saves processing resources because the system is inhibited and/or prevented from dealing with costly reconnection procedures that may comprise reestablishing of multiple sessions with user equipment in a predefined coverage area.

In one or more embodiments, the systems and methods may be performed by an apparatus, such as a server communicatively coupled to multiple network components in a core network, one or more base stations in a radio access network, and one or more user equipment. Further, the systems may be a wireless communication system, which comprises the apparatus. In addition, the systems may be performed as part of a process performed by the apparatus communicatively coupled to the network components in the core network. As a non-limiting example, the apparatus may comprise a memory and a processor communicatively coupled to one another. An apparatus comprises a memory and a processor communicatively coupled to one another. The memory may be operable to store one or more communication conditions of a communication network in one or more locations. The processor is configured to receive internal data associated with a communication device and receive a system communication from the communication device. The internal data may reference telemetry data in the communication device. The system communication may reference multiple discrepancies in multiple communication operations performed by the communication device. Further, the processor may be configured to determine one or more connections between the telemetry data and the discrepancies and evaluate the one or more connections in accordance with multiple communication conditions of the one or more communication conditions to determine multiple modifications for an access communication in response to determining the one or more connections between the telemetry data and the discrepancies. At each modification in the access communication, each of the telemetry data may be matched to one or more discrepancies of the discrepancies. The processor may be configured to generate the access communication comprising the modifications, determine one or more resolution paths for each modification of the modifications, and transmit the resolution paths to the communication device. Each resolution path comprising one or more modification commands configured to modify configuration data in the communication device.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

EXAMPLE EMBODIMENTS

Figure 1:
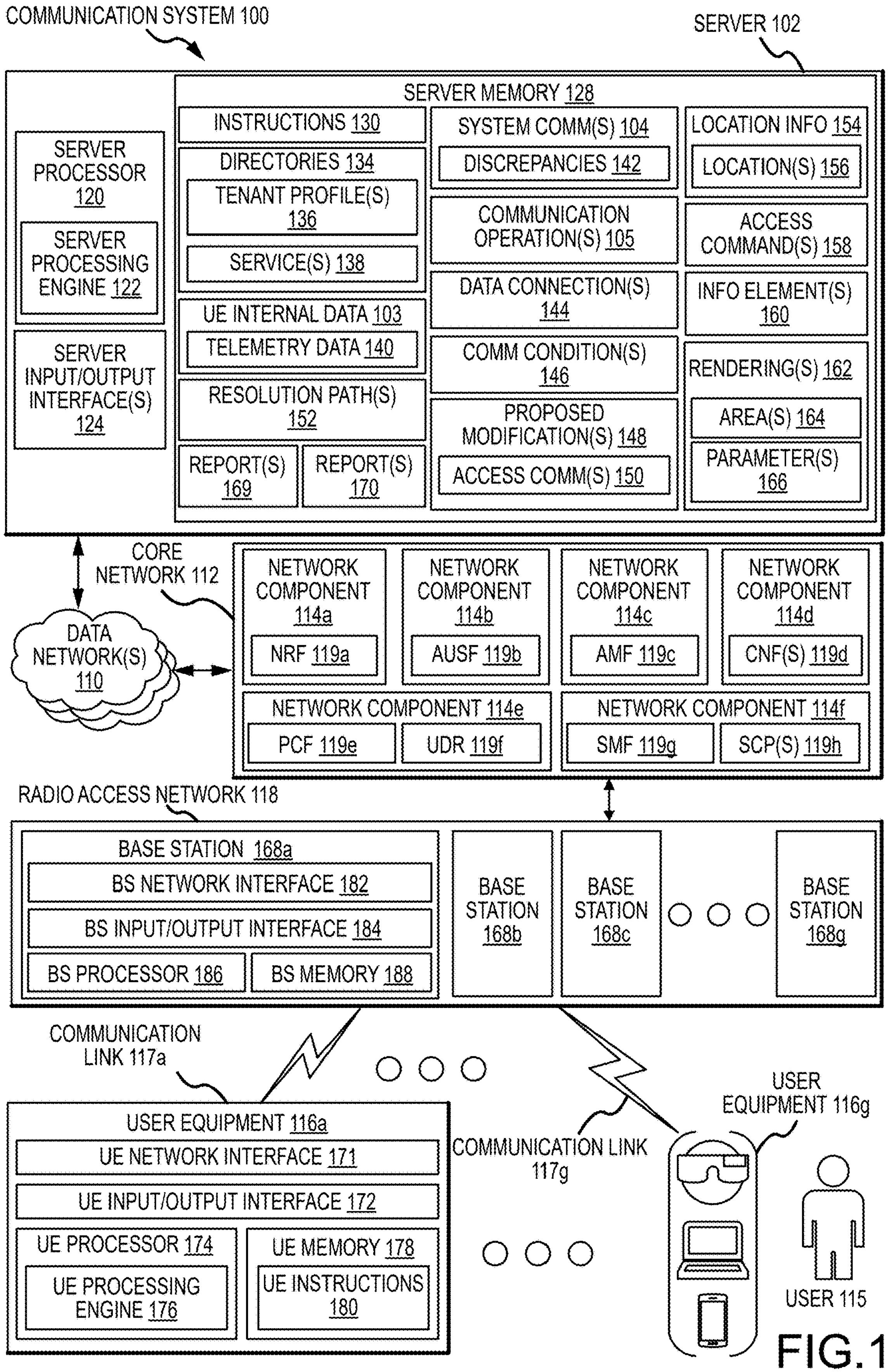
FIG. 1 illustrates an example communication system, in accordance with one or more embodiments.
Figure 2:
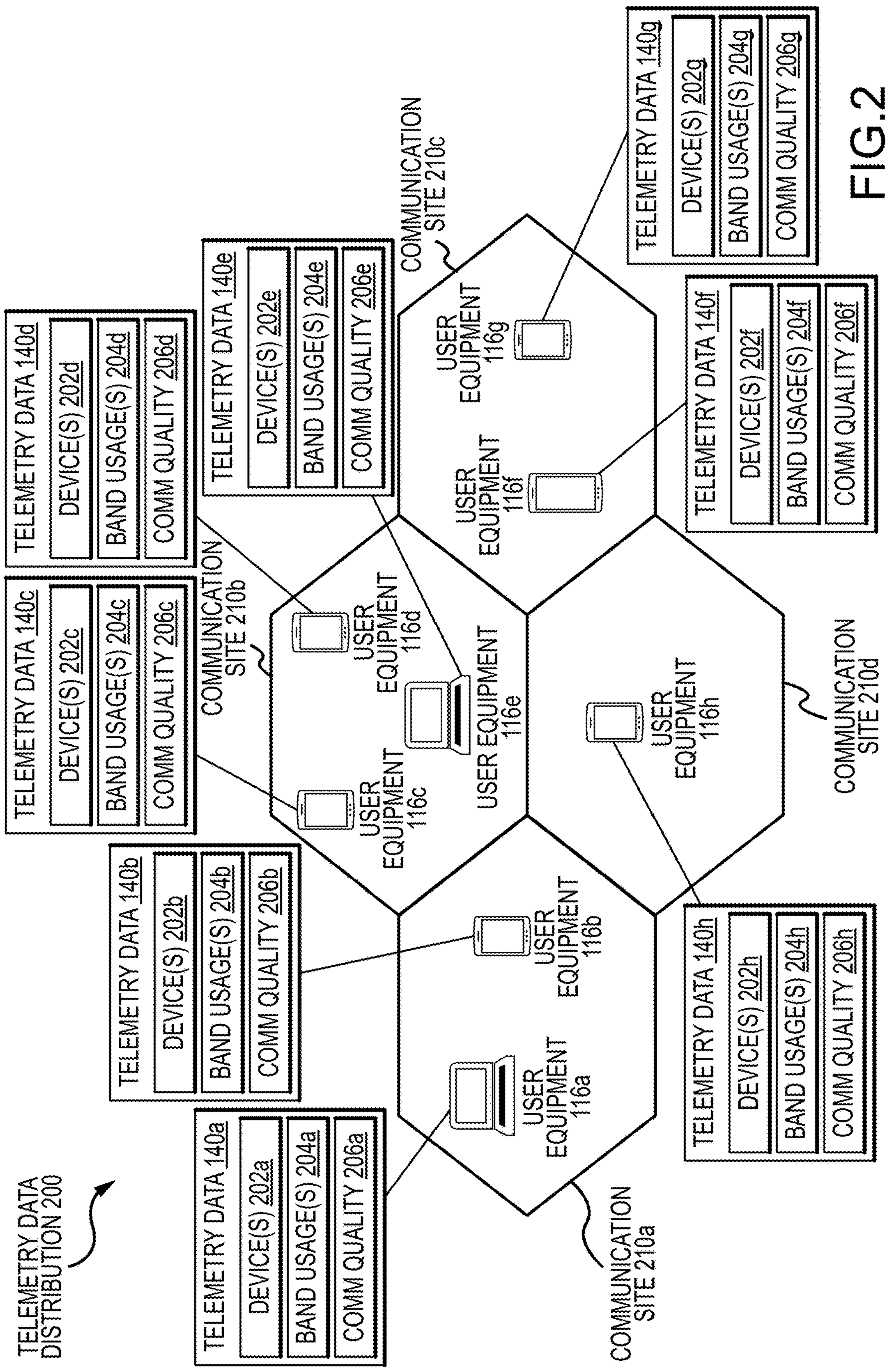
FIG. 2 illustrates example telemetry data distribution in the communication system of FIG. 1, in accordance with one or more embodiments.
Figure 3:
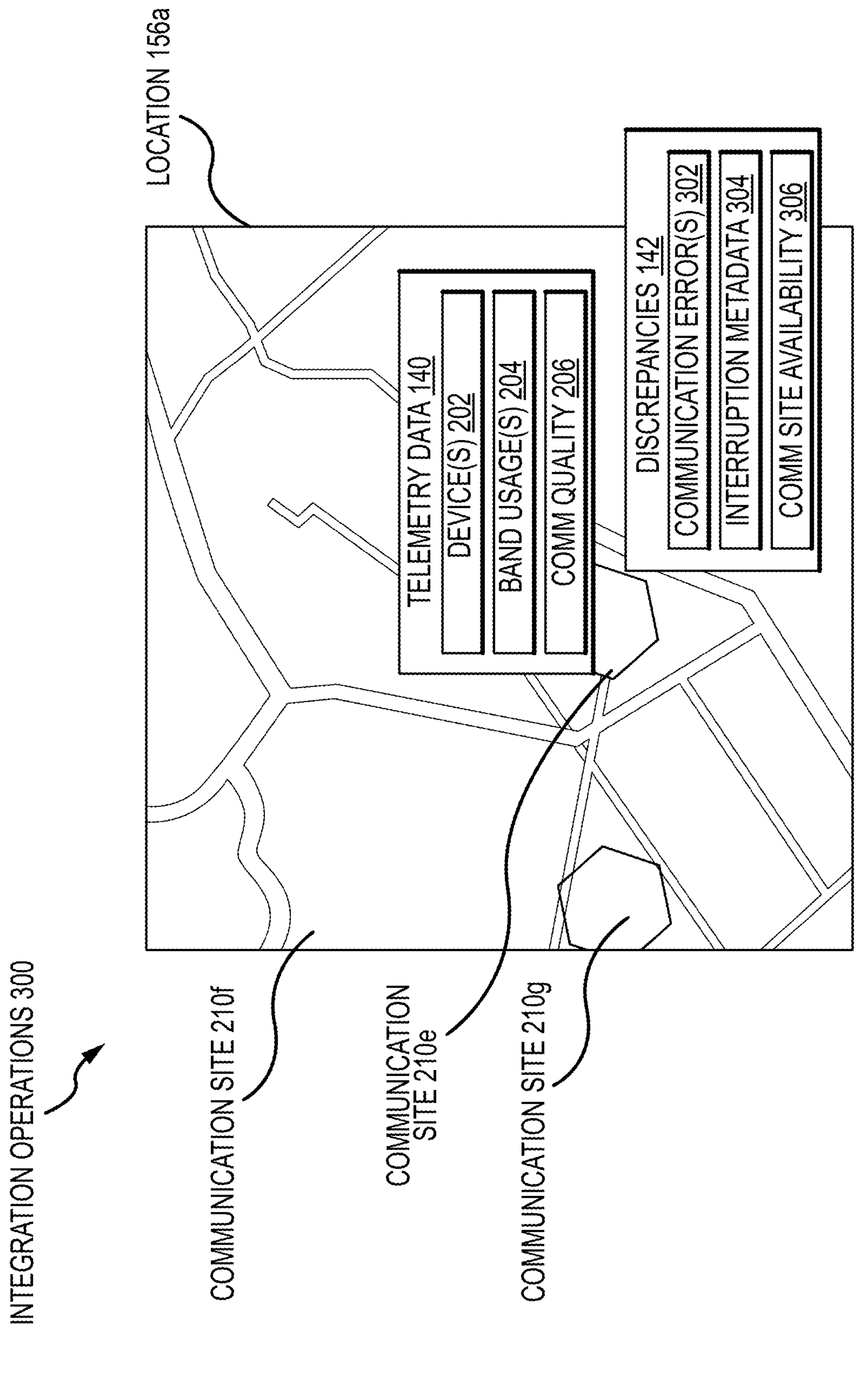
FIG. 3 illustrates example integration operations performed by the communication system of FIG. 1, in accordance with one or more embodiments.
Figure 4:
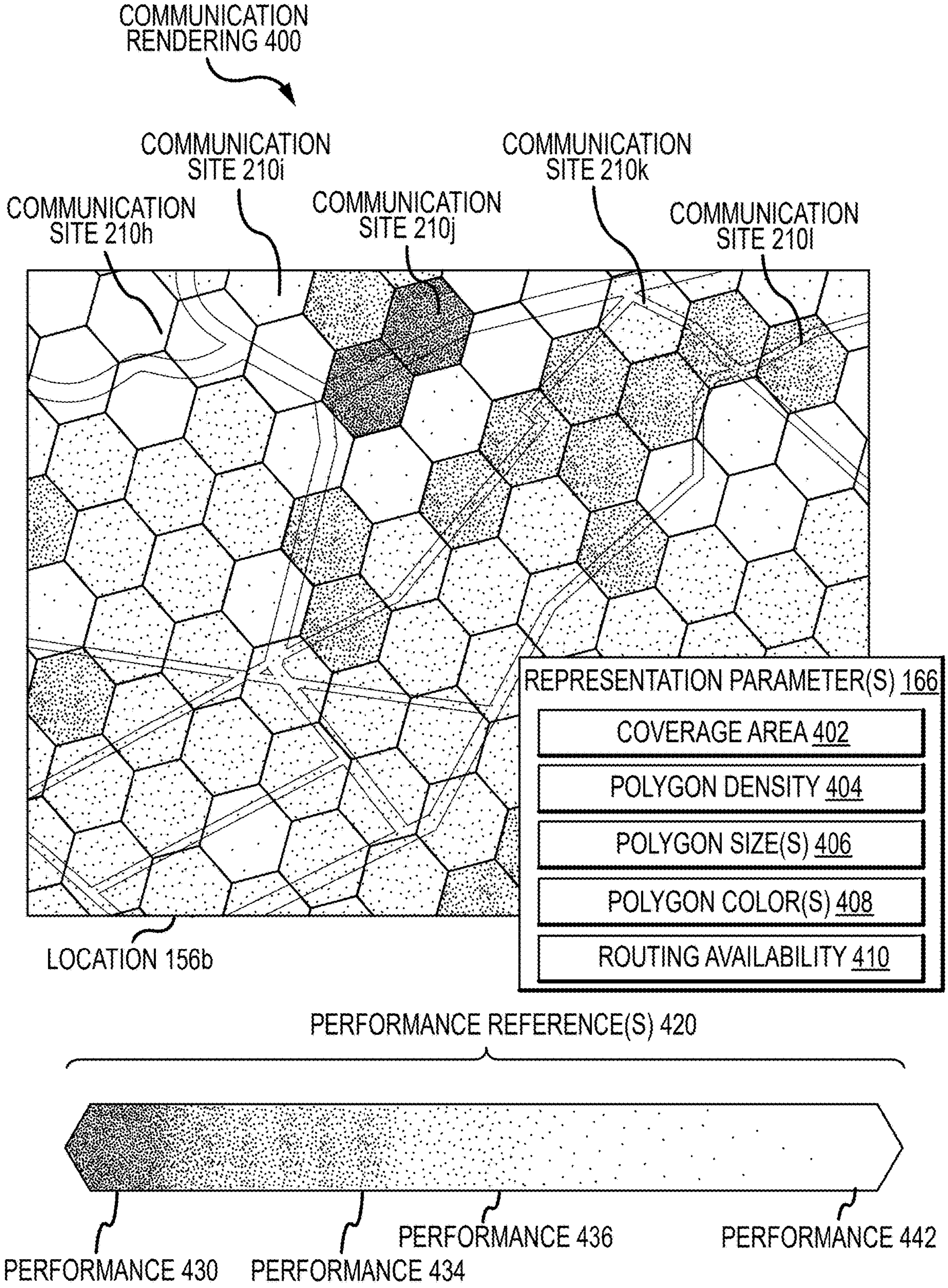
FIG. 4 illustrates an example communication rendering based on the integration operations of FIG. 3, in accordance with one or more embodiments.
Figure 5:
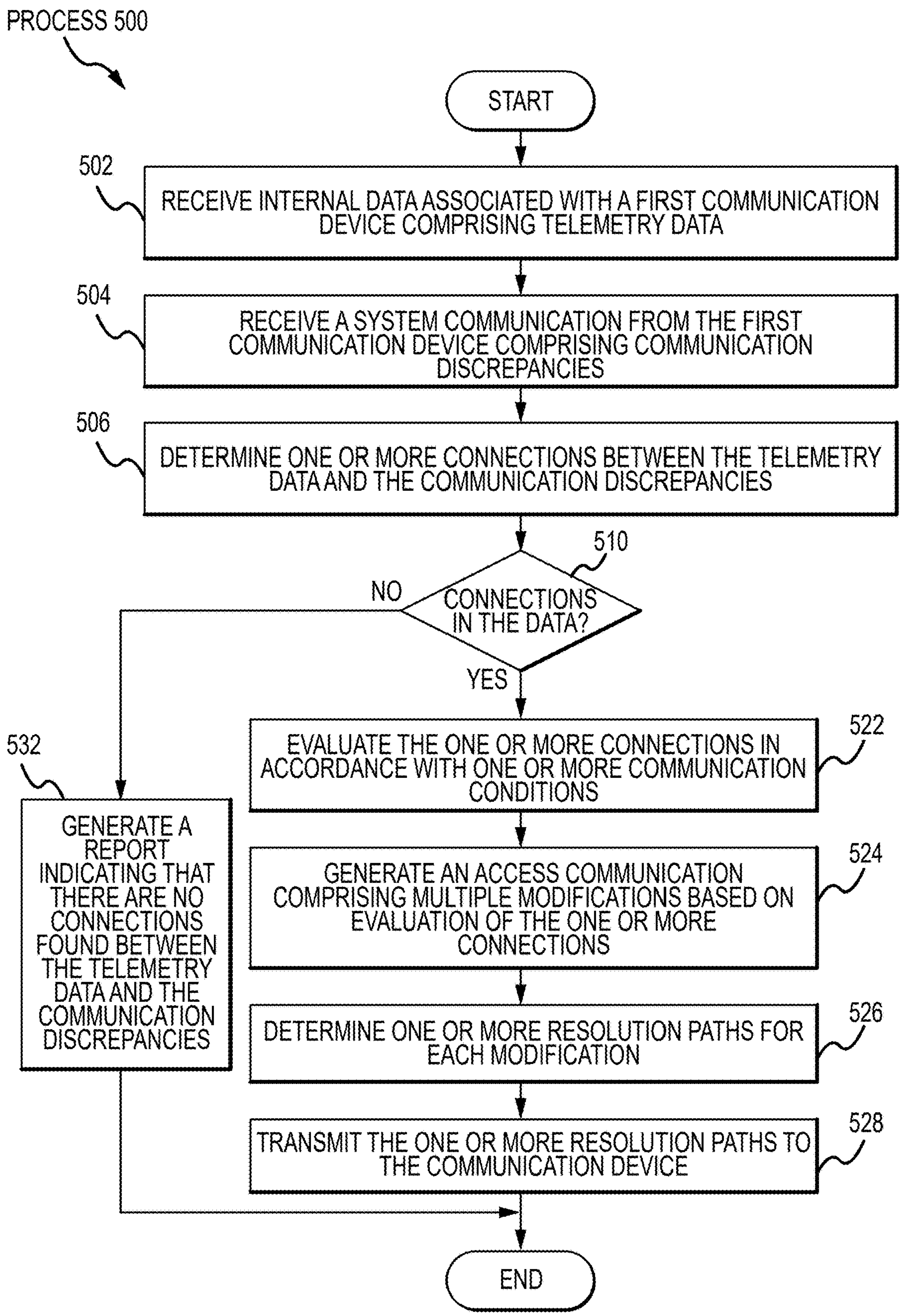
FIG. 5 illustrates an example flowchart of a method to perform one or more integration operations performed by the communication system of FIG. 1, in accordance with one or more embodiments.

In one or more embodiments, systems and methods described herein are configured to perform one or more integration operations. In one or more embodiments, FIG. 1 illustrates a communication system 100 in which a server 102 is configured to integrate one or more user equipment internal data 103 and one or more user equipment system communications 104 in evaluations of one or more communication operations 105. FIG. 2 illustrates telemetry data distribution 200 in one or more communication sites 210 of the communication system 100 of FIG. 1. FIG. 3 illustrates integration operations 300 performed by the communication system 100 of FIG. 1 in one or more communication sites 210. FIG. 4 illustrates communication rendering 400 performed based on the integration operations of FIG. 3. FIG. 5 illustrates a process 500 to integrate one or more user equipment internal data 103 and one or more user equipment system communications 104 in evaluations of one or more communication operations 105 performed in the communication system of FIG. 1.

Communication System Overview

FIG. 1 illustrates a diagram of a communication system 100 (e.g., a wireless communication system) that comprises a server 102 configured to integrate one or more user equipment internal data 103 and one or more user equipment system communications 104 (e.g., system reports) in evaluations of one or more communication operations 105, in accordance with one or more embodiments. In the communication system 100 of FIG. 1, the server 102 may be a communication terminal communicatively coupled to one or more data networks 110, a core network 112, and/or a radio access network (RAN) 118, in accordance with one or more embodiments. In the communication system 100 of FIG. 1, the server 102 may be communicatively coupled to the one or more data networks 110, the core network 112, and the RAN 118. In FIG. 1, the server 102 is communicatively coupled to multiple user equipment 116*a*-116*g* (collectively, user equipment 116) via the RAN 118 and multiple corresponding communication links 117*a*-117*g* (collectively, communication links 117) shown as being established between each user equipment 116 and the RAN 118. As represented by a user equipment 116*g*, the user equipment 116 may be operated or attended to by one or more users 115. In the example of FIG. 1, the server 102 may be communicatively coupled to multiple additional devices in the communication system 100. While FIG. 1 shows the server 102 connected directly to the one or more data networks 110, the server 102 may be located inside the core network 112 as part of one or more network components 114 (e.g., any of the network components 114*a*-114*g*) in the core network 112.

In some embodiments, the communication system 100 may comprise a Fifth Generation (5G) and/or a Sixth Generation (6G) mobile network or wireless communication system, utilizing high frequency bands (e.g., 24 Gigahertz (GHz), 39 GHz, and the like) or lower frequency bands such (e.g., frequency range FR1 Sub 6 GHz-less than 7.125 GHz). In this regard, the communication system 100 may comprise a large number of antennas. In some embodiments, the communication system may perform one or more communication operations 105 associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or 6G mobile networks.

Service-Based Architecture

The communication system 100 may comprise a service-based architecture (SBA). The SBA may be an organization scheme in the core network 112 that comprises authentication, security, session management, and aggregation of traffic from end devices (e.g., the user equipment 116). In the SBA, the core network 112 may be representative of the 5G Core network and comprises multiple network components 114. In the SBA, the network components 114 are hardware (e.g., electronic circuitry with communication ports, a processor, and a memory) configured to host and/or perform one or more specific Network Functions (NFs) 111. Herein, network components 114*a*-114*f* configured to perform one or more NFs 111 may be referenced using an NF-associated name. For example, a network component 114*a* configured to perform a Network Repository Function (NRF) 111*a* may be referred to as an NRF (or an NRF network component). In another example, one of the network components 114*a*-114*f* may comprise a version of the server 102 with a server processor 120 configured to perform one or more specific NFs 111.

In some embodiments, individual network components 114 provide services 138 or resources to other network components 114 performing different NFs 111. In other embodiments, each NF may be a service provider that allocates one or more resources in communications inside or outside the network components 114 to provide one or more services 138. The services 138 may be specific for each of the network components 114 and their respective NFs 111 instead of each of the network components 114 providing and consuming processing resources and memory resources to perform multiple NFs 111 in the core network 112. In 5G NR mobile networks, the SBA is defined by the 3GPP standards to comprise one or more network components 114 configured to perform specific NFs 111 to provide control plane operations and user plane operations. In the 5G NR, the control plane comprises any part of the communication system 100 that controls operations and routing associated with data packets and forwarding operations. Further, in the 5G NR, the user plane comprises any part of the communication system 100 that carries user traffic operations.

In one or more embodiments, the SBA may be configured to provide network slices in accordance with specific application scenarios. A network slice may be one or more portions of a collection of NFs 111 that are combined into providing specific application resources and/or network resources. In some embodiments, access to the application resources and/or the network resources may be provided to one or more user equipment 116 simultaneously via web-based Application Programming Interfaces (APIs). The APIs may enable flexible and agile deployment of innovative services 138. An API may be a set of instructions that, when executed by a processor, perform modular or cloud-native functions and procedures allowing creation of applications (e.g., the services 138) that access features or data of an operating system, application, or other service in the communication system 100.

Communication System Components

Server

In one or more embodiments, the system and method may be performed by an apparatus, such as a server, communicatively coupled to multiple network components in a core network, one or more base stations in a radio access network, and one or more user equipment. The server 102 is generally any device that is configured to process data, communicate with the data networks 110, one or more network components 114 in the core network 112, the RAN 118, and the user equipment 116. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 122. The operations of the server processing engine 122 are described further below. In some embodiments, the server 102 comprises the server processor 120, one or more server Input (I)/Output (O) interfaces 124, and a server memory 128 communicatively coupled to one another. The server 102 may be configured as shown, or in any other configuration. As described above, the server 102 may be located in one of the network components 114 located in the core network 112 and may be configured to perform one or more NFs 111 associated with communication operations of the core network 112. The server 102 may be configured to request access to one or more Application Functions (AFs, such as the one or more AFs 111*h*) dedicated to specific functionality provided by a given network slice.

The server 102 may be configured to collect and/or evaluate one or more telemetry data distribution 200 described in reference to FIG. 2. The server 102 may be configured to perform the integration operations 300 described in reference to FIG. 3. The server 102 may be configured to perform one or more versions of the communication rendering 400 described in reference to FIG. 4. The server 102 may be configured to execute the process 500 described in reference to FIG. 5.

In one or more embodiments, the server processor 120, the server I/O interfaces 124, and the server memory 128 may be located at a same location or distributed over multiple remote locations separate from one another.

The server processor 120 may comprise one or more processors operably coupled to and in signal communication with the server I/O interfaces 124, and the server memory 128. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 130 from the server memory 128 and executes the server instructions 130 by directing the coordinated operations of the ALU, registers and other components via the server processing engine 122. The server processor 120 may be configured to execute various instructions. For example, the server processor 120 may be configured to execute the server instructions 130 to perform functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

In the example of FIG. 1, the server I/O interfaces 124 may comprise one or more displays configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users 115. The one or more displays may be configured to present visual information to the one or more users 115 updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In one or more embodiments, the server I/O interfaces 124 may be hardware configured to perform one or more communication operations. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may comprise one or more server network interfaces that may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the user equipment 116, the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 124 may be configured to support any suitable type of communication protocol.

The server I/O interfaces 124 may comprise one or more administrator interfaces that may be user interfaces configured to provide access and control to of the server 102 to one or more users 115 via the user equipment 116 or electronic devices. The one or more users 115 may access the server memory 128 upon confirming one or more access credentials to demonstrate that access or control to the server 102 may be modified. In some embodiments, the one or more administrator interfaces may be configured to provide hardware and software resources to the one or more users 115. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., the one or more displays), a touch-screen, a touchpad, multiple keys, multiple buttons, a mouse, or any other suitable type of hardware that allow users 115 to view data or to provide inputs into the server 102. The server 102 may be configured to allow users 115 to send requests to one or more network components 114 or network.

The server memory 128 may be volatile or non-volatile and may comprise a read-only memory (ROM), random-access memory (RAM), ternary content-addressable memory (TCAM), dynamic random-access memory (DRAM), and static random-access memory (SRAM). The server memory 128 may be implemented using one or more disks, tape drives, solid-state drives, and/or the like. The server memory 128 is operable to store the server instructions 130, one or more directories 134 comprising access to multiple tenant profiles 136 associated with one or more services 138, user equipment internal data 103 comprising telemetry data 140 associated with one or more user equipment 116, one or more system communications 104 comprising discrepancies 142 in one or more communication operations 105 performed by one or more user equipment 116, one or more communication operations 105, one or more data connections 144, one or more communication conditions 146, one or more proposed modifications comprising one or more access communications 150, one or more resolution paths 152, location information 154 comprising one or more locations 156, one or more access commands 158, one or more information elements 160, one or more communication renderings 162 comprising one or more areas 164, one or more representation parameters 166, one or more reports 169, and one or more requests 170. In the server memory 128, the server instructions 130 may comprise commands and controls for operating one or more specific NFs 111 in the core network 112 when executed by the server processing engine 122 of the server processor 120.

The directories 134 may be configured to store service-specific information, tenant-specific information, and/or user-specific information. The directories 134 may enable the server 102 to confirm tenant credentials to access one or more network components (e.g., one of the network components 114 configured to perform the NRF 111*a*, an Authentication Server Function (AUSF) 111*b*, an Access and Management Function (AMF) 111*c*, one or more Cloud Network Functions (CNFs) 111*d*, a Policy Control Function (PCF) 111*e*, a Unified Data Repository (UDR) 111*f*, a Network Exposure Function (NEF) 111*g*, one or more AFs 111*h*, a Session Management Function (SMF) 111*i*, one or more Service Communication Proxys (SCPs) 111*j*, a User Plane Function (UPF) 111*k*, a Unified Data Storage Function (UDSF) 111*l*, or the like) in the core network 112. The directories 134 may be configured to store the tenant profiles 136 and a reference to the one or more services 138. The directories 134 may be configured to store provider-specific information and service-specific information. The provider-specific information may enable the server 102 to validate credentials associated with a specific provider (e.g., one of the NFs 111) against corresponding user-specific information and service-specific information. The directories 134 may be configured to store service-specific information and/or user-specific information. The directories 134 may enable the server 102 to confirm user credentials to access the one or more network components 114 (e.g., one of the network components 114 configured to host and/or perform one or more NFs 111 in the core network 112). The directories 134 may be configured to store provider-specific information. The directories 134 may enable the server 102 to validate credentials associated with a specific provider (e.g., one of the NFs) against corresponding user-specific information in the directories 134.

In one or more embodiments, the user equipment internal data 103 may be information comprising internal information associated with one or more specific user equipment 116. The user equipment internal data 103 may comprise telemetry data 140 provided to the server 102 from one or more of the user equipment 116. The user equipment internal data 103 may be one or more messages, communication signaling, and/or control signaling exchanged as part of one or more communication operations 105 between the user equipment 116 and the server 102. The user equipment internal data 103 may be generated and/or transmitted by the user equipment 116 on demand and/or as part of one or more reporting operations triggered by the server 102. The user equipment internal data 103 may be provided to the server 102 periodically and/or dynamically over time.

The telemetry data 140 may comprise information related to a performance of one or more of the user equipment 116 over a period of time. The telemetry data 140 may comprise information representative of a number of user equipment 116 and/or a number of base stations 168 exchanging communication operations 105 in a given communication site 210. The telemetry data 140 may comprise information representative of devices 202, band usages 204, and communication quality 206 (e.g., quality of service (QoS)) among others in each of the communication sites 210. The devices 202, the band usages 204, and the communication quality 206 are discussed in more detail in reference to FIG. 2. The telemetry data 140 may be current data indicating current performance and/or operations in one or more of the user equipment 116. The telemetry data 140 may be historical data indicating previous performance and/or operations in one or more of the user equipment 116.

In one or more embodiments, the system communications 104 may be information comprising system information associated with one or more specific user equipment 116. The user equipment system communications 104 may comprise one or more discrepancies 142 provided to the server 102 from one or more of the user equipment 116. The user equipment system communications 104 may be one or more messages, communication signaling, and/or control signaling exchanged as part of one or more communication operations 105 between the user equipment 116 and the server 102. The one or more user equipment system communications 104 may be generated and/or transmitted by the user equipment 116 on demand and/or as part of one or more reporting operations triggered by one or more users 115 associated with a corresponding user equipment 116. The system communications 104 may be provided to the server 102 periodically and/or dynamically over time.

The one or more discrepancies 142 comprise information related to adverse performance impacts of one or more of the user equipment 116 over a period of time. The one or more discrepancies 142 may comprise information representative of interruptions between a number of user equipment 116 and/or a number of base stations 168 exchanging communication operations 105 in a given communication site 210. The one or more discrepancies 142 may comprise information representative of communication errors 302, interruption metadata 304, and communication site availability 306 among others in each of the communication sites 210. The communication errors 302, the interruption metadata 304, and the communication site availability 306 are discussed in more detail in reference to FIG. 3. The one or more discrepancies 142 may be current data indicating current interruptions (e.g., adverse performance impacts and/or interrupted operations) in one or more of the user equipment 116. The one or more discrepancies 142 may be historical data indicating previous interruptions in one or more of the user equipment 116. Communication operations 105 in the communication sites 210 may be interrupted due to power outages or wireline cuts in a case of a natural disaster near specific communication sites 210. Interruptions may cause the communication sites 210 to be unavailable for routing communications between network components (e.g., including, but not limited to, the user equipment 116 and/or the base stations 168). Further, interruptions may cause existing communications between network components to be dropped by one or more base stations 168 at the communication sites 210. The one or more discrepancies 142 may be a change or modification in connectivity between two network components. The one or more discrepancies 142 may be a break in signaling between any two network components. In some embodiments, a given communication session between a user equipment **116*a* and a user equipment 116*b* may be interrupted by one or more changes caused to a wireline (e.g., wired) connection at a given communication site 210 (e.g., comprising one or more of the base stations 168). In other embodiments, the communication session between the user equipment 116*a* and the user equipment 116*b* may be interrupted by one or more changes caused to a microwave (e.g., wireless) connection at the given communication site 210. The communication system 100 may be configured to reduce, inhibit, prevent, or eliminate adverse impacts of the one or more discrepancies 142 to one or more communication sessions by reactively or proactively migrating resource assignments within a single communication site 210 and/or across multiple communication sites 210**.

The one or more communication operations 105 may be one or more data exchanges performed between two or more network devices in the communication system 100. The network devices may comprise the server 102, the one or more base stations 168, and the one or more user equipment 116 among others. In one or more embodiments, the communication operations 105 may be audio communications exchanged as part of audio conversations (e.g., during a telephonic call) between two or more network devices. The communication operations 105 may be image and/or text communications exchanged as part of image-based conversations (e.g., during videocalls and/or chat exchanges) between two or more network devices. The one or communication operations 105 may be one or more operations executed by the server processor 120 configured to enable data objects to be exchanged between the server 102, the one or more base stations 168, and the one or more user equipment 116. In one or more embodiments, the communication operations 105 may be configured to indicate one or more data objects to be exchanged between the server 102 and at least one of the user equipment 116. The server 102 may be configured to generate and analyze one or more communication operations 105. The server 102 may be configured to perform one or more operations to evaluate whether the communication operations 105 belong to a specific user equipment 116. The one or more communication operations 105 may be one, some, and/or all signaling exchanged between the server 102, one or more additional network components (e.g., nodes and routers among others), the one or more base stations 168, the one or more user equipment 116, and/or any other equipment and/or devices associated with the one or more data networks 110. The communication operations 105 may be any control commands and/or signaling associated with transmissions and/or receptions of one or more devices in the communication system 100. The one or more communication operations 105 may be one or more data exchanges performed between two or more network devices in the system 100. The network devices may comprise the server 102, the one or more base station 168, and/or one or more of the user equipment 116 among others. In one or more embodiments, the communication operations 105 may be audio communications exchanged as part of audio conversations (e.g., during a telephonic call) between two or more network devices. The communication operations 105 may be image and/or text communications exchanged as part of image-based conversations (e.g., during videocalls and/or chat exchanges) between two or more network devices.

In one or more embodiments, the one or more data connections 144 may be correlated relations between the telemetry data 140 and the one or more discrepancies 142. Herein, the server 102 may be configured to correlate information in the telemetry data 140 to one or more interruptions of service in the discrepancies 142 by determining usage of one or more network resources at specific user equipment 116, comparing the usage of the network resources with an expected usage level at a same time, match comparison results to one or more interruptions determined in a predefined area surrounding the specific user equipment 116. The server 102 may be configured to evaluate each of the data connections 144 against one or more communication conditions 146. The one or more communication conditions 146 may be one or more configuration parameters configured to provide guidelines and/or information to inform the analyses performed by the server processor 120. The communication conditions 146 may be updated periodically over time. The communication conditions 146 may be updated dynamically over time. The communication conditions 146 may be guidelines to analyze current and/or existing of network resources, assignment information, and/or the telemetry data 140.

In one or more embodiments, the one or more proposed modifications 148 may be recommendations presented to modify allocation of network resources used by the base stations 168, the user equipment 116, and/or additional network component based on one or more analysis results. The one or more proposed modifications 148 may comprise one or more dynamic suggestions to modify approaches for performing one or more communication operations 105. In one or more embodiments, the one or more proposed modifications 148 are the one or more assignments configured to control operations of the server 102, the base stations 168, and/or the user equipment 116. The one or more proposed modifications 148 may be optimized configuration commands configured to dynamically provide control information to perform one or more of the operations based at least in part upon the telemetry data 140 in the user equipment internal data 103 and the discrepancies 142 in the system communications 104. In one or more embodiments, the server 102 may be configured to evaluate the one or more data connections 144 in accordance with one or more communication conditions 146 to determine one or more proposed modifications 148 for one or more access communications 150 in response to determining the one or more communication connections 146 between the telemetry data 140 and the discrepancies 142. At each proposed modification 148 in the access communication 150, each of the telemetry data 140 in the user equipment internal data 140 are matched to one or more discrepancies 142 in the system communications 104. The one or more access communications 150 may be one or more communication messages and/or signaling configured to provide one or more of the proposed modifications 148 to one or more network devices.

In one or more embodiments, the one or more access communications 150 may be configured to provide one or more of the proposed modifications 148 to one or more network devices. The one or more access communications 150 may be configured to trigger modification (e.g., add, maintain, and/or remove) network resources assigned to one or more specific user equipment 116 in a given communication site 210. The proposed modifications 148 in the one or more access communications 150 may be suggestions configured to be performed immediately (e.g., within a short period of time, such as a couple of seconds or less), over a period of time (e.g., periodically over a period of time), and/or at a scheduled time (e.g., at a later time). The proposed modifications 148 in the one or more access communications 150 may suggest implementation of one or more assignments in the communication sites 210. The assignments may be deployed simultaneously and/or in sequence. The assignments suggested and/or provided by the proposed modifications 148 in the one or more access communications 150 may be configured as redundancies of one another or as standalone assignments in a wireless communication network. The proposed modifications 148 in the one or more access communications 150 may comprise one or more dynamic suggestions to modify the access commands 158. In one or more embodiments, the dynamic suggestions are the one or more access commands 158 configured to control operations of the server 102, the base stations 168, and/or the user equipment 116.

In one or more embodiments, the one or more resolution paths 152 may be a roadmap and/or a plan to provide implement one or more of the proposed modifications 148 over a period of time. Each resolution path 152 may comprise one or more modification commands configured to modify configuration data in the one or more user equipment 116 and/or any additional communication devices. The one or more resolution paths 152 may be one or more roadmaps to modify configuration of network resources used by one or more communication devices. The one or more resolution paths 152 may be the same for multiple communication devices. The one or more resolution paths 152 may be different for multiple communication devices. The one or more resolution paths 152 may be at least partially similar to multiple communication devices. In some embodiments, the server 102 may be configured to determine whether one or more resolution paths 152 are at least partially similar and/or different from one another.

In one or more embodiments, the location information 154 may comprise information representative of one or more locations 156 surrounding specific user equipment 116. The location information 154 may reference a geolocation of the specific user equipment 116. The one or more location information 154 may comprise area boundaries in a specific location 156.

In one or more embodiments, the access commands 158 are configured to establish one or more communication sessions between two or more network components 114 in the core network 112 and/or one or more communication devices in the RAN 118 and/or the user equipment 116. The access commands 158 may be configured to establish one or more communication sessions between one or more network components 114 in the core network 112 and one of the user equipment 116. Each of the access commands 158 may establish a communication session between the network components 114 comprising the server 102 and one or more communication devices. The access commands 158 may be routing and configuration information for reinstating or reestablishing communication sessions when a change is detected in the operations of the communication system 100. The access commands 158 may be dynamically or periodically updated from another of the network components 114 in the core network 112. Herein, communication sessions refer to communication signals exchanged between the server 102 and additional network components 114 in the core network 112. In some embodiments, the access commands 158 are provided to the server 102 from another of the network components 114 performing a specific NF. The access commands 158 may be configured to enable access of the one or more services. The access commands 158 may be configured to enable access of one or more name-spaces (not shown) and/or one or more slice groups (not shown) in a given containerized cluster (e.g., clusters in containerized environments, such as Kubernetes environments).

The information elements 160 may be generated to influence modification of communication sites 210 (e.g., cell site) construction in a predefined area. In some embodiments, the server 102 may be configured to generate one or more information elements 160 configured to inform presence of cell site interruptions in a predefined area. The server may be configured to broadcast the information elements 160 to one or more communication devices in a communication network. The information elements 160 may be security configuration commands or regulatory operations predefined by an organization or one or more users 115. The one or more information elements 160 may be one or more policies as defined in the 3GPP standards. The information elements 160 may be prioritization rules configured to regulate data signaling or control signaling of the communication session.

In one or more embodiments, the communication renderings 162 may be one or more representations of analyses performed on the user equipment internal data 103 and the system communications 104. The communication renderings 162 may be one or more visual and/or audio representations of data and/or information. For example, the communication renderings 162 may comprise graphs, maps, and/or dynamic and/or static schematics among others. In one or more embodiments, the communication renderings 162 may comprise one or more areas 164 and/or multiple representation parameters 166. The one or more areas 164 may be portions of a geological area comprising multiple boundaries based on the location information 154. The representation parameters 166 may be one or more configuration commands configured to indicate changes and/or modifications to one or more communication operations 105 in one or more specific areas 164.

The one or more reports 169 may be communications or messages configured to indicate information to one or more of the network components 114, the base stations 168, and/or the user equipment 116. The reports 169 may comprise one or more updates associated with capabilities and/or configuration of the user equipment 116. The reports 169 may be signaling comprising statuses and/or availability information associated with the one or more of the network components 114, the base stations 168, and/or the user equipment 116. For example, the statuses may be received in response to one or more requests 170. The statuses may be one or more acknowledgement signals comprising current capabilities at the user equipment 116.

The requests 170 may be one or more communications or messages configured to indicate a request for access of an application (via an API) or a service. The requests 170 may be one or more messages and/or signaling received at the server 102. The requests 170 may be one or more availability requests to perform one or more communication operations 105 with the one or more communication devices. The requests 170 may be generated by the server 102. The requests 170 may be availability requests transmitted to the one or more communication devices. The requests 170 may be communications and/or messages requesting access to specific network resources in a network slice in accordance with a corresponding priority level. Further, the requests 170 may be messages comprised in one or more communication operations 105. The requests 170 may be configured to request one or more connectivity allowances (e.g., access) between the server 102, the user equipment 116, the base stations 168, and one or more of the network components 114.

User Equipment

In one or more embodiments, each of the user equipment 116 may be any computing device configured to communicate with other devices, such as the server 102, other network components 114 in the core network 112, databases, and the like in the communication system 100. Each of the user equipment 116 may be configured to perform specific functions described herein and interact with one or more network components 114 in the core network 112 via one or more base stations 168*a*-168*g* (collectively, base stations 168). Examples of user equipment 116 comprise, but are not limited to, a laptop, a computer, a smartphone, a tablet, a smart device, an IoT device, a simulated reality device, an augmented reality device, or any other suitable type of device.

In one or more embodiments, referring to the user equipment 116*a* as a non-limiting example of the user equipment 116, the user equipment 116*a* may comprise a user equipment (UE) network interface 171, a UE I/O interface 172, a UE processor 174 executing operations via a UE processing engine 176, and a UE memory 178 comprising one or more instructions 180 configured to be executed by the UE processor 174. The UE network interface 171 may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 171 may be configured to support any suitable type of communication protocol.

The UE I/O interface 172 may be hardware configured to perform one or more communication operations. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 6G, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 116*a* may comprise capabilities for voice communication, mobile broadband services (e.g., video streaming, navigation, and the like), or other types of applications. In this regard, the UE I/O interface 172 of the user equipment 116*a* may communicate using machine-to-machine (M2M) communication, such as machine-type communication (MTC), or another type of M2M communication.

In some embodiments, the user equipment 116*a* is communicatively coupled to one or more of the base stations 168 via the one or more communication links 117*a*-117*g* (e.g., collectively, the communication links 117). The user equipment 116*a* may be a device with cellular communication capability such as a mobile phone, a hand-held device, a computer, a laptop, a tablet, a smart watch or other wearable device, or virtually any type of wireless device. In some applications, the user equipment 116 may be referred to as a UE, UE device, or terminal.

The UE processor 174 may comprise one or more processors operably coupled to and in signal communication with the UE network interface 171, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as UE instructions 180 from the UE memory 178 and executes the UE instructions 180 by directing the coordinated operations of the ALU, registers, and other components via a UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

Radio Access Network

In one or more embodiments, the RAN 118 enables the user equipment 116 to access one or more services 138 in the core network 112. The one or more services 138 may be a mobile telephone service, a Short Message Service (SMS) message service, a Multimedia Message Service (MMS) message service, an Internet access, cloud computing, or other types of data services. The RAN 118 may comprise the base stations 168 in signal communication with the user equipment 116 via the one or more communication links 117. Each of the base stations 168 may service the user equipment 116*a*-116*g*. In some embodiments, while multiple base stations 168 are shown connected to multiple user equipment 116 via the communication links 117, one or more additional base stations 168 may be connected to one or more additional user equipment 116 via one or more additional communication links 117. For example, the base stations 168a-168g may exchange connectivity signals with the user equipment 116a via the communication link 117a. In another example, the base station 168g may exchange connectivity signals with the user equipment 116g via the communication link 117g. In yet another example, the base stations 168 may service some user equipment 116 located within a geographic area serviced by one of the base stations 168.

In one or more embodiments, referring to the base station 168a as a non-limiting example of the base stations 168, the base station 168a may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 112 and the user equipment 116. These connections may comprise, but not be limited to, all or a portion of network connections coupled to additional network components 114 in the core network 112, other base stations 168, the user equipment 116, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 6G, 5G NR, or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 168a may allocate resources in accordance with one or more routing and configuration operations obtained from the core network 112. In some embodiments, resources may be allocated to enable capabilities in the user equipment 116 for voice communication, mobile broadband services (e.g., video streaming, navigation, and the like), or other types of applications.

In some embodiments, the base station 168a is communicatively coupled to one or more of the user equipment 116 via the one or more communication links 117. In some applications, the base stations 168 may be referred to as a BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

Core Network

The core network 112 may be a network configured to manage communication sessions for the user equipment 116. In one or more embodiments, the core network 112 may establish connections between user equipment 116 and a particular data network 110 in accordance with one or more communication protocols. The core network 112 may be a multi-core network 112 configured to comprise multiple cores. In this regard, the multi-core network may comprise multiple NFs III in each core. In the example of FIG. 1, the core network 112 comprises the network component 114a configured to host and/or perform the NRF 111a, the network component 114b configured to host and/or perform the AUSF 111b, the network component 114c configured to host and/or perform the AMF 111c, the network component 114d configured to host and/or perform the CNFs 111d, the network component 114e configured to perform the PCF 111e, the UDR 111f, the NEF 111g, and the one or more AFs 111h, and the network component 114f configured to perform the SMF 111i, the one or more SCPs 111j, the UPF 111k, and the UDSF 111l. Herein, as a non-limiting example, while the NRF 111a is associated with the network component 114a, the core network 112 may comprise multiple network component 114 hosting and/or performing the NRF 111a. For example, a Unified Data Management (UDM) may be part of a core.

In some embodiments, the NRF Ila may comprise a service registration procedure that accesses the one or more databases to store or retrieve routing and configuration information associated with one or more network components 114 in the core network 112. The NRF 111a may access the database to discover services 138 offered by other networks or other network components 114 with service discovery procedures and service authorization procedures. The NRF 111a may maintain a list of available NFs operations available in the core network 112 and any network components 114 associated with performing a given NF 111. The NRF 111a may also performs registration and discovery of service such that different NFs 111 may find each other via APIs. As an example, when the SMF 111i is registered to the NRF Ila, the SMF 111i is discoverable by the AMF IIIc when the user equipment 116 attempts to access a given service type via the SMF 111i. In other embodiments, the NFs 111 may be connected via a communication bus to all other additional network elements in the core network 112. In the SBA, the NRF 111a may enable access between the user equipment 116 and the services 138 offered via the NFs 111.

In one or more embodiments, the network components 114d hosting and/or performing the one or more CNFs 111d may be configured to operate multiple operations associated with one or more services 138, while dynamically directing network traffic within the core network 112. The network components 114*f* hosting and/or performing the SMF liii may be configured to manage one or more communication sessions established between network components 114 of the core network 112, allocate and manage resource allocation routing for the user equipment 116, user plane selection, QoS and configuration enforcements for the control plane, service registration, discovery, establishment, and the like. In other embodiments, the network component 114*c* hosting and/or performing the AMF 111*c* may be configured to manage mobility, registration, connections, and overall access for the other network components 114 in the core network 112. The AMF 111*c* may act as an entry point for connections between the user equipment 116 and a given service. In yet other embodiments, the network component 114*f* hosting and/or performing the one or more SCPs 111*j* may be configured to provide a point of entry for a cluster of NFs 111 in the core network 112 to the user equipment 116 once the user equipment 116 are discovered by the NRF 111*a*. This allows the SCPs 111*j* to be delegated discovery points in the core network 112. The network component 114*b* hosting and/or performing the AUSF 111*b* may be configured to share performing of some of the aforementioned operations with a Unified Data Management (UDM) (not shown). In this regard, the AUSF 111*b* may be configured to perform authentication processes while the UDM manages user data for any other processes in the core network 112. In other embodiments, the UDM may receive requests for subscriber data from the SMF 111*i*, the AMF 111*c*, and the AUSF 111*b* before providing any services 138. The AUSF 111*b* may be implemented in one of the network components 114 configured to enable the AMF 111*c* to authenticate the user equipment 116. The network component 114*e* hosting and/or performing the PCF 111*e* may be configured to provide a policy control framework in which rules and policies are implemented in accordance with one or more application guidelines. In some embodiments, the PCF 111*e* may apply policy decisions to services 138 provided, accessing subscription information, and the like to control behavior associated with the core network 112. The network component 114*e* hosting and/or performing the UDR 111*f* configured to operate as a centralized data repository for subscription data, subscriber policy data, session information, context information, and application states. In some embodiments, the UDR 111*f* may be configured to provide API integrations with other NFs 111 to retrieve subscriber subscription and policy data. The UDR 111*f* may notify other NFs 111 of changes in subscriber data, supports real-time or batch (e.g., bulk) data access provisioning and subscriber data provisioning, and manages service parameters and application data for advanced applications.

In one or more embodiments, one or more network components 114 hosting and/or performing one or more Network Data Analytics Functions (NWDAFs) may be configured to streamline processes that regulate how core network data is produced and consumed, as well as to generate insights and take actions to enhance end-user experience. Further, one or more network components hosting and/or performing one or more Network Slice Admission Control Functions (NSACFs) may be configured to monitor and control the number of registered user equipment 116 and established Protocol Data Unit (PDU) sessions per network slice and feed the information to one or more AFs for analysis and further processing.

In some embodiments, the network component 114*e* hosting and/or performing the NEF 111*g* may be configured to securely expose network capabilities and events provided by 3GPP NFs 111 to the AFs 111*h*. The NEF 111*g* may be configured to enable the AFs 111*h* to securely provide information to 3GPP networks and may authenticate, authorize, and/or assist in throttling the AFs 111*h*. The NEF 111*g* may be configured to translate information received from the AFs 111*h* to data sent to internal 3GPP NFs 111, and vice versa. The NEF 111*g* may be configured to expose information (e.g., collected from other 3GPP NFs 111) to the AFs 111*h*. The NEF 111*g* may be configured to support one or more Power Flow Detection (PFD) functions that may allow the AFs 111*h* to provision the one or more PFDs and store and retrieve PFDs in the UDR. The NEF 111*g* may be further configured to provision the one or more PFDs to the SMF 111*i*. A specific NEF 111*g* instance may support one or more of the functionalities described above and consequently an individual NEF 111*g* may support a subset of one or more APIs specified for capability exposure. For example, as described in technical specification 29.522 of the 3GPP standards, the NEF 111*g* may be configured to access the UDR located in a same PLMN as the NEF 111*g*.

The network component 114*e* hosting and/or performing the AF 111*h* may be configured to access the core network 112 via the NEF 111*g* in order to access network capabilities. As described in technical specification 29.517 of the 3GPP standards, the AF 111*h* is a functional element configured to provide service-related information and/or application-related information to NF service consumers (e.g., user equipment 116). The AF 111*h* may be configured to allow NF service consumers to subscribe to and/or unsubscribe from periodic notifications and/or notifications related to detection of subscribed events. The AF 111*h* may be configured to provide an application function exposure service configured to allow NF service consumers to subscribe to, modify, and/or unsubscribe from application events. Further, the service may be configured to notify NF service consumers with corresponding subscriptions about observed events on the AF 111*h*.

The network component 114*f* hosting and/or performing the UPF 111*k* may be configured to provide an interconnect point between a mobile infrastructure and the data networks 110 (e.g., encapsulation and decapsulation of protocols for the user plane). As described in technical specification 23.501 of the 3GPP standards, the PDU session anchor point may be configured to provide mobility within and/or between one or more Radio Access Technologies (RATs). The UPF 111*k* may be configured to send one or more end marker packets to the base stations 168. The UPF 111*k* may be configured to perform packet routing and forwarding, including performing a role of an Uplink Classifier (UL-CL) directing flows to specific data networks 110 based on traffic-matching filters and a branching point.

The network component 114*f* hosting and/or performing the UDSF 111*l* may be configured to store and retrieve unstructured data (e.g., data that is not defined in 3GPP specifications). Herein, structured data may refer to data for which structure is defined in 3GPP specifications. The UDSF 111*l* may be configured to run timers and get notified on timer expiry. As described in technical specification 23.501 of the 3GPP standards, the UDSF 111*l* is deployed in the same network where the CP NF is located and the same UDSF 111*l* may be shared by all the NFs 111 in the PLMN to store and/or retrieve respective data. An NF 111 may have a corresponding UDSF 111*l* depending on operator configuration.

In some embodiments, the core network 112 enables the user equipment 116 to communicate with the server 102, or another type of device, located in a particular data network

110 or in signal communication with a particular data network 110. The core network 112 may implement a communication method that does not require the establishment of a specific communication protocol connection between the user equipment 116 and one or more of the data networks 110. The core network 112 may include one or more types of network devices (not shown), which may perform different NFs 111.

In some embodiments, the core network 112 may include a 6G, 5G NR, and/or an LTE access network (e.g., an evolved packet core (EPC) network) among others. In this regard, the core network 112 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 116. For example, a logical network may be a Mobile Private Network (MPN) configured for a particular organization. In this example, when the user equipment **116*a* is configured and activated by a wireless network associated with the RAN 118, the user equipment 116*a* may be configured to connect to one or more particular network slices (i.e., logical networks) in the core network 112. Any logical networks or slices that may be configured for the user equipment 116*a* may be configured using one of the network components 114 of FIG. 1 performing the NSSF that may store a subscription profile associated with the user equipment 116*a*, in a network component operating as a Unified Data Management (UDM). Further, when the user equipment 116*a* may request a connection to a particular logical network or slice, the user equipment 116*a* may send a request to the network component performing the AMF 111*c*. The AMF 111*c* may provide a list of allowed logical networks or slices to the user equipment 116*a*. The user equipment 116*a*** may then request a PDU connection with one or more of the provided logical networks or slices.

In one or more embodiments, the server 102 is configured to perform multiple network slicing operations. In this regard, the network slicing operations may be configured to run multiple logical networks as virtually independent organization operations on a common physical infrastructure. The organization operations may comprise service instance layer operations, network slice instance layer operations, and resources layer operations.

Data Networks

In the example system 100 of FIG. 1, the data networks 110 may facilitate communication within the communication system 100. This disclosure contemplates that the data networks 110 may be any suitable network operable to facilitate communication between the server 102, the core network 112, the RAN 118, and the user equipment 116. The data networks 110 may comprise one or more transport networks that include any interconnecting system capable of transmitting audio, video, signals, data, messages, or any combination of the preceding. The data networks 110 may include all or a portion of a LAN, a WAN, an overlay network, a software-defined network (SDN), a virtual private network (VPN), a packet data network (e.g., the Internet), a mobile telephone network (e.g., cellular networks, such as 4G, 5G, or 6G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Example Telemetry Data Distribution

FIG. 2 illustrates an example of telemetry data distribution 200 across multiple communication sites **210*a*-210*d* (collectively, communication sites 210) in the communication system 100 of FIG. 1, in accordance with one or more embodiments. While the telemetry data distribution 200 comprises the communication sites 210*a*-210*d*, a given location 156 may comprise less or more communication sites 210. Each of the communication sites 210 may comprise one or more base stations 168 communicating with one or more user equipment 116. Each of the user equipment 116 may provide telemetry data 140 in one or more communication operations 105 directed towards the server 102. In some embodiments, the telemetry data 140 may be aggregated (e.g., compiled), structured, and/or transmitted to the server 102 by one or more base stations 168 in each of the communication sites 210. In the example of FIG. 2, each telemetry data 140 may reference one or more devices 202 in communication with specific user equipment 116, one or more band usages 204 (e.g., assignments) associated with the one or more communication operations 105 performed by specific user equipment 116, and at least one communication quality 206 associated with one or more of the communication operations 105**, among others.

In one or more embodiments, the communication site **210*a* comprises a user equipment 116*a* that may be configured to provide telemetry data 140*a* referencing one or more devices 202*a*, one or more band usages 204*a*, and at least one communication quality 206*a* associated with one or more communication operations 105*a* performed by the user equipment 116*a* and a user equipment 116*b* that may be configured to provide telemetry data 140*b* referencing one or more devices 202*b*, one or more band usages 204*b*, and at least one communication quality 206*b* associated with one or more communication operations 105*b* performed by the user equipment 116*b*. The communication site 210*b* comprises a user equipment 116*c* that may be configured to provide telemetry data 140*c* referencing one or more devices 202*c*, one or more band usages 204*c*, and at least one communication quality 206*c* associated with one or more communication operations 105*c* performed by the user equipment 116*c*, a user equipment 116*d* that may be configured to provide telemetry data 140*d* referencing one or more devices 202*d*, one or more band usages 204*d*, and at least one communication quality 206*d* associated with one or more communication operations 105*d* performed by the user equipment 116*d*, and a user equipment 116*e* that may be configured to provide telemetry data 140*e* referencing one or more devices 202*e*, one or more band usages 204*e*, and at least one communication quality 206*e* associated with one or more communication operations 105*e* performed by the user equipment 116*e***.

The devices 202 may comprise one or more user equipment 116 and/or one or more base stations 168 communicatively coupled to a specific user equipment 116. The communication sites 210 may comprise more or less base stations 168 than those shown in FIG. 2. The band usages 204 may comprise information representative of one or more communication capabilities in the communication sites 210. For example, the band usages 204*a* of the user equipment 116*a* may indicate that the devices 202*a* comprise 5G communication capabilities and/or 6G communication capabilities. In some embodiments, the band usages 204*a* may indicate a current use of the communication spectrum and/or historical use of the communication spectrum for the user equipment 116*a*. The communication quality 206*a* of the user equipment 116*a* may be configured to indicate an overall QoS in the communication site 210*a* and/or individual QoS information for each of the devices 202*a*.

Example Integration Operations

FIG. 3 illustrates an example of integrated operations 300 implemented by the communication system 100 of FIG. 1, in accordance with one or more embodiments. In the example of FIG. 3, the integrated operations 300 comprise integration of multiple reporting operations comprising user equipment internal data 103 and multiple system communications 104 associated with one or more user equipment 116 in the communication site 210*e*. While FIG. 3 shows the communication site 210*f*, the communication site 210*g*, and the communication site 210*e* in a location 156*a*, user equipment 116 in less or more communication sites 210 in the location 156*a* may be configured to provide user equipment internal data 103 and system communications 104 to the server 102.

In one or more embodiments, the telemetry data 140 comprises one or more devices 202, one or more band usages 204, and one or more corresponding communication qualities 206. In one or more embodiments, a same user equipment 116 in the communication site 210*e* may transmit multiple telemetry data 140 over time. Further, multiple user equipment 116 may be configured to transmit telemetry data 140 to the server 102 at a same and/or at different periods of time.

In one or more embodiments, the one or more discrepancies 142 may be configured to reference one or more interruptions experienced by specific user equipment 116. The one or more discrepancies 142 comprise one or more communication errors 302, interruption metadata 304, and communication site availability 306. The one or more communication errors 302 may be representative of one or more interruptions experienced by one or more user equipment 116. The one or more communication errors 302 may reference drops in communication operations 105 between specific user equipment 116 in one or more communication sites 210. The interruption metadata 304 may comprise metadata associated with one or more services (e.g., applications) involved in one or more of the communication operations 105 dropped and/or configured to cause one or more communication errors 302. The communication site availability 306 may be information referencing one or more lists, tables, and data files comprising one or more communication devices operably configured to communicate with specific user equipment 116.

In one or more embodiments, the user equipment internal data 103 and the system communications 104 may be received at the server 102 anonymously such that no information associated with the users 115 is received. In some embodiments, the discrepancies 142 may be reported to the server 102 anonymously. In other embodiments, the discrepancies 142 may be reported to the server 102 solely referencing one or more reference identifiers from a user 115 associated with specific user equipment 116.

As shown in the example of FIG. 3, there may be multiple communication sites 210*f*-210*g* in the location 156*a*. Each of the communication sites 210*f*-210*g* may comprise multiple user equipment 116 that report one or more telemetry data 140 in user equipment internal data 103 and/or multiple discrepancies 142 in system communications 104.

In one or more embodiments, the server 102 may be configured to integrate user equipment internal data 103 and user equipment system communications 104 in communication operation evaluations in which the system is configured to determine whether the user equipment operates in accordance with one or more target metrics. The user equipment internal data 103 may be information received from a specific user equipment 116*a* (e.g., used as an example) configured to reference telemetry data 140 in the specific user equipment 116*a*. The telemetry data 140 may be tracked and updated periodically or dynamically over time. Examples of the telemetry data 140 may comprise information referencing a number of devices 202*a* connected to the specific user equipment 116*a*, one or more band usages 204*a* performed by the specific user equipment 116*a*, and/or communication quality 206*a* associated with one or more communication operations performed between the specific user equipment 116*a* and one or more surrounding communication devices 202*a*. The user equipment system communications 104 may be information received from a specific user equipment 116*a* configured to reference one or more discrepancies 142 in one or more communication operations 105 performed by the user equipment 116. The one or more discrepancies 142 may be determined and broadcasted periodically or dynamically over time. Examples of the discrepancies 142 may comprise information referencing communication errors 302 determined in an area 164 neighboring the specific user equipment 116*a*, interruption metadata 304 of one or more interruptions of service experienced by the specific user equipment 116*a*, and/or communication site 210 available to communicate with the specific user equipment 116*a*. The server 102 may be configured to perform one or more communication operation evaluations where correlations are made between the telemetry data 140 and the one or more discrepancies 142 received over a same period of time. Herein, the server 102 is configured to determine one or more data connections 144 (e.g., correlated relations) between the telemetry data 140 and the one or more discrepancies 142. For example, the server 102 may correlate a band usage 204*a* in the telemetry data 140 to one or more interruptions of service in the reported discrepancies 142 by determining that the specific user equipment 116*a* use one or more spectrum bands below an expected usage level at a same time where an interruption of a specific service is identified for the user equipment 116*a*.

In one or more embodiments, the server 102 may be configured to evaluate each of the data connections 144 against one or more communication conditions 146. For example, the server 102 may be configured to determine that a specific band was used at a level below an expected usage level while the specific user equipment 116*a* attempted to perform one or more communication operations 105 associated with the specific service. The communication conditions 146 may be one or more dynamic and/or static area status parameters referencing external influences in a predefined area surrounding the specific user equipment 116*a*. Examples of the communication conditions 146 may comprise weather events, communication patterns associated with the specific user equipment 116*a*, and/or mass behavioral patterns based on bandwidth usage for several communication devices in the predefined area.

In some embodiments, the server 102 may be configured to generate one or more configuration modifications (e.g., one or more proposed modifications 148) to resolve, inhibit, prevent, reduce, and/or eliminate one or more of the discrepancies 142 in the communication network. The server 102 may be configured to determine one or more resolution paths 152 for each modification. Each resolution path 152 may comprise one or more modification commands configured to modify configuration data in the specific user equipment 116*a* to resolve, inhibit, prevent, reduce, and/or eliminate the discrepancies 142. At this stage, the server 102 may be configured to transmit the resolution paths 152 to the specific user equipment 116*a* for implementation at the specific user equipment 116*a*. In turn, the specific user equipment 116*a* may be configured to broadcast to the server 102 whether the resolution paths 152 were locally implemented and/or executed.

In one or more embodiments, the server 102 is configured to receive multiple different data sources, structure the received data sources, evaluate the received data sources in accordance with one or more communication conditions, and determine one or more resolution paths to inhibit, prevent, and/or resolve one or more interruptions experienced by one or more user equipment 116. In some embodiments, the server 102 may be configured to dynamically generate resolution paths 152 based of multiple data stream types collected over time.

Example Communication Rendering

FIG. 4 illustrates an example communication rendering 400 implemented by the communication system 100 of FIG. 1, in accordance with one or more embodiments. In the example of FIG. 4, the communication rendering 400 comprises visual representation of a location 156*b* comprising multiple communication sites 210. The communication rendering 400 comprises one or more visual representations rendered based on multiple reporting operations comprising user equipment internal data 103 and multiple system communications 104 associated with one or more user equipment 116 in multiple communication sites 210. While FIG. 4 shows the communication site 210*h*, the communication site 210*i*, the communication site 210*j*, the communication site 210*k*, and the communication site 210*l* in the location 156*b*, user equipment 116 in less or more communication sites 210 in the location 156*b* may be configured to provide user equipment internal data 103 and system communications 104 to the server 102. In some embodiments, the communication rendering may be generated in accordance with one or more of the representation parameters 166 and one or more performance references 420.

In the example of FIG. 4, the representation parameters 166 comprise a coverage area 402, a polygon density 404, one or more polygon sizes 406, one or more polygon colors 408, and routing availability 410. The coverage area 402 may be one or more areas 164 over one or more locations 156 comprising multiple boundaries. For example, the coverage area 402 may be an area of service in a city as shown in the example of FIG. 4. The polygon density 404 may be a representation of service quality and/or service availability in the coverage area 402. The polygon density 404 may be one or more levels of proximity (e.g., density) between polygons generated for the representative visual representation of user equipment performance in the locations 156. For example, the polygon density 404 may indicate that the communication sites 210*h*-210*l* are within one or more distances from one another. Further, the polygon density 404 may indicate that the communication sites 210*h*-210*l* are within one or more distances from adjacent polygons.

The one or more polygon sizes 406 may be a representation of service quality and/or service availability in the coverage area 402. The one or more polygon sizes 406 may be one or more levels of dimension (e.g., size) of polygons generated for the representative visual representation of user equipment performance in the locations 156. For example, the polygon sizes 406 may indicate that the communication sites 210*h*-210*l* comprise specific traffic loads at any given time. In the example of FIG. 4, a polygon size 406*a* of the communication site 210*h* may indicate that there are no user equipment 116 communicating with the server 102. A polygon size 406*b* of the communication site 210*i* may indicate that user equipment 116 in the communication site 210*h* comprise a first amount of traffic, a polygon size 406*c* of the communication site 210*j* may indicate that user equipment 116 in the communication site 210*j* comprise a second amount of traffic, a polygon size 406*d* of the communication site 210*k* may indicate that user equipment 116 in the communication site 210*k* comprise a third amount of traffic, and a polygon size 406*e* of the communication site 210*l* may indicate that user equipment 116 in the communication site 210*l* comprise a fourth amount of traffic. Herein, the polygons shown are generally of a same size given that the communication rendering 400 is not configured to show a polygon size 406 corresponding to traffic loads. Instead, the polygon density is used to visualize a level of granularity of traffic in the communication sites 210.

The one or more polygon colors 408 may be a representation of service quality and/or service availability in the coverage area 402. The one or more polygon colors 408 may be one or more levels of traffic (e.g., operational loads) and/or number of interruptions shown in the polygons generated for the representative visual representation of user equipment performance in the locations 156. For example, the polygon colors 408 may indicate that the communication sites 210*h*-210*l* comprise specific numbers of interruptions at any given time. In the example of FIG. 4, a polygon color 408*a* of the communication site 210*h* may indicate that there are no user equipment 116 communicating with the server 102. A polygon color 408*b* of the communication site 210*i* may indicate that user equipment 116 in the communication site 210*h* comprise a first number of interruptions, a polygon color 408*c* of the communication site 210*j* may indicate that user equipment 116 in the communication site 210*j* comprise a second number of interruptions, a polygon color 408*d* of the communication site 210*k* may indicate that user equipment 116 in the communication site 210*k* comprise a third number of interruptions, and a polygon color 408*e* of the communication site 210*l* may indicate that user equipment 116 in the communication site 210*l* comprise a fourth number of interruptions. Herein, the polygons shown are generally of different colors given that the communication rendering 400 is configured to show polygon colors 408 corresponding to corresponding numbers of interruptions reported. In FIG. 4, the performance references 420 are representative of multiple performances 430-442. In this case, the multiple performances correspond to color coding shown in the location 156*b*. For example, a first color of the performance 430 is shown representative of the first number of interruptions shown in the communication site 210*j*, a second color of the performance 434 is shown representative of a second number of interruptions shown in the communication site 210*i*, a third color of the performance 436 is shown representative of a third number of interruptions shown in the communication site 210*k*, and a fourth color of the performance 442 is shown representative of a fourth number of interruptions shown in the communication site 210*l*.

The routing availability 410 may be a representation of service availability in the coverage area 402. The routing availability 410 may be information representative of one or more devices 202 and/or communication sites 210 available to receive rerouted traffic from communication sites 210 undergoing heavy traffic loads.

Example Process to Integrate User Equipment Internal Data and User Equipment System Reports in Communication Operation Evaluations FIG. 5 illustrates an example flowchart of the process 500 configured to the integrate user equipment internal data 103 and the user equipment system communications 104 in one or more communication operation evaluations, in accordance with one or more embodiments. Modifications, additions, or omissions may be made to the process 500. The process 500 may include more, fewer, or other operations than those shown above. For example, operations may be performed in parallel or in any suitable order. While at times discussed as the server 102, one or more of the network components 114, one or more of the base stations 168, one or more user equipment 116, components of any of thereof, or any suitable system or components of the communication system 100 may perform one or more operations of the process 500. For example, one or more operations of the process 500 may be implemented, at least in part, in the form of server instructions 130 of FIG. 1, stored on non-transitory, tangible, machine-readable media (e.g., server memory 128 of FIG. 1 operating as a non-transitory computer-readable medium) that when run by one or more processors (e.g., the server processor 120 of FIG. 1) may cause the one or more processors to perform operations described in operations 502-532.

The process 500 starts at operation 502, where the server 102 is configured to receive user equipment internal data 103*a* associated with a communication device (e.g., user equipment 116*a*) comprising telemetry data 140*a*. In some embodiments, the user equipment internal data 103*a* may reference the telemetry data 140*a* in the communication device. At operation 504, the server 102 is configured to receive a system communication 104*a* from the communication device comprising communication discrepancies 142*a*. In some embodiments, the system communication 104*a* may reference the discrepancies 142*a* in one or more communication operations 105 performed by the communication device. At operation 506, the server 102 is configured to determine one or more connections (e.g., one or more data connections 144) between the telemetry data 140*a* and the communication discrepancies 142*a*.

The process 500 continues at operation 510, where the server 102 is configured to determine whether one or more of the connections were determined between the telemetry data 140*a* and the communication discrepancies 142*a*. If the server 102 determines that there are data connections 144 between the telemetry data 140*a* and the one or more communication discrepancies 142*a* (i.e., YES), the process 500 proceeds to operation 522. If the server 102 determines that the there are no data connections 144 between the telemetry data 140*a* and the one or more communication discrepancies 142*a* (i.e., NO), the process 500 proceeds to operation 532.

The process 500 may conclude at operations 522-528, where the server 102 is configured to determine issues in communication operations 105 performed by one or more user equipment 116 in a predefined area 164. At operation 522, the server 102 is configured to evaluate the one or more connections in accordance with one or more communication conditions 146. In response to determining the one or more connections between the telemetry data 140*a* and the discrepancies 142*a*, the server 102 may be configured to evaluate the connections in accordance with one or more communication conditions 146 to determine one or more modifications (e.g., one or more proposed modifications 148) for an access communication 150. At each modification in the access communication 150, each of the telemetry data 140*a* may be matched to one or more discrepancies 142*a*. At operation 524, the server 102 is configured to generate the access communication 150 comprising multiple modifications based on evaluation of the one or more connections. At operation 526, the server 102 is configured to determine one or more resolution paths 152 for each modification. In some embodiments, the server 102 may be configured to determine the resolution paths 152 for each modification. Herein, each resolution path 152 may comprise one or more modification commands configured to modify configuration data in the communication device. At operation 528, the server 102 is configured to transmit the one or more resolution paths 152 to the communication device.

The process 500 may conclude at operation 532, where the server 102 is configured to generate a report 169 indicating that there are no connections found between the telemetry data 140*a* and the communication discrepancies 142*a*.

In one or more embodiments, the server 102 may be configured to determine location information 154 associated with the communication device and associate the location information 154 to the access communication 150. The communication conditions 146 may be determined to impact the communication operations 105 in a location 156 associated with the location information 154.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:

a memory operable to store:

one or more communication conditions of a communication network in one or more locations; and a processor communicatively coupled to the memory and configured to:

receive first internal data associated with a first communication device, the first internal data referencing a first plurality of telemetry data in the first communication device;

receive a first system communication from the first communication device, the first system communication referencing a first plurality of discrepancies in a first plurality of communication operations performed by the first communication device;

determine one or more first connections between the first plurality of telemetry data and the first plurality of discrepancies;

in response to determining the one or more first connections between the first plurality of telemetry data and the first plurality of discrepancies, evaluate the one or more first connections in accordance with a first plurality of communication conditions of the one or more communication conditions to determine a first plurality of modifications for a first access communication, at each modification in the first access communication, each of the first plurality of telemetry data being matched to one or more discrepancies of the first plurality of discrepancies;

generate the first access communication comprising the first plurality of modifications;

determine a first plurality of resolution paths for each modification of the first plurality of modifications, each resolution path comprising one or more modification commands configured to modify configuration data in the first communication device; and transmit the first plurality of resolution paths to the first communication device.

2. The apparatus of claim 1, wherein:

the processor is further configured to:

determine first location information associated with the first communication device; and associate the first location information to the first access communication; and the first plurality of communication conditions is determined to impact the first plurality of communication operations in a first location associated with the first location information.

3. The apparatus of claim 2, wherein the processor is further configured to:

receive second internal data associated with a second communication device, the second internal data referencing a second plurality of telemetry data in the second communication device;

receive a second system communication from the second communication device, the second system communication referencing a second plurality of discrepancies in a second plurality of communication operations performed by the second communication device;

determine one or more second connections between the second plurality of telemetry data and the second plurality of discrepancies;

determine second location information associated with the second communication device;

in response to determining the one or more second connections between the second plurality of telemetry data and the second plurality of discrepancies, evaluate the one or more second connections in accordance with a second plurality of communication conditions to determine a second plurality of modifications for a second access communication, wherein:

the second plurality of communication conditions are determined to impact the second plurality of communication operations in a second location matching the second location information; and the second plurality of modifications comprising one or more of the second plurality of telemetry data matched to one or more of the second plurality of discrepancies;

associate the second location information to the second access communication;

generate the second access communication comprising the second plurality of modifications;

receive third internal data associated with a third communication device, the third internal data referencing a third plurality of telemetry data in the third communication device;

receive a third system communication from the third communication device, the third system communication referencing a third plurality of discrepancies in a third plurality of communication operations performed by the third communication device;

determine one or more third connections between the third plurality of telemetry data and the third plurality of discrepancies;

determine third location information associated with the third communication device;

in response to determining the one or more third connections between the third plurality of telemetry data and the third plurality of discrepancies, evaluate the one or more third connections in accordance with a third plurality of communication conditions to determine a third plurality of modifications for a third access communication, wherein:

the third plurality of communication conditions are determined to impact the third plurality of communication operations in a third location matching the third location information; and the third plurality of modifications comprising one or more of the third plurality of telemetry data matched to one or more of the third plurality of discrepancies;

associate the third location information to the third access communication;

generate the third access communication comprising the third plurality of modifications;

determine whether the second location information associated with the second access communication matches the third location information associated with the third access communication;

in response to determining that the second location information associated with the second access communication matches the third location information associated with the third access communication, determine a second plurality of resolution paths for each modification of the second plurality of modifications and a third plurality of resolution paths for each modification of the third plurality of modifications;

determine whether the second plurality of resolution paths matches the third plurality of resolution paths;

generate a fourth plurality of resolution paths based on the second plurality of resolution paths that match the third plurality of resolution paths; and transmit the fourth plurality of resolution paths to the second communication device and the third communication device.

4. The apparatus of claim 3, wherein the processor is further configured to:

generate a visual communication rendering comprising an area comprising the first location associated with the first location information and the second location associated with the second location information; and present the visual communication rendering comprising the area to one or more communication devices.

5. The apparatus of claim 4, wherein:

the visual communication rendering comprising the area comprises a plurality of polygons;

the plurality of polygons comprises a first polygon corresponding to the first location and a second polygon corresponding to the second location;

the first polygon comprises a first size corresponding to a first number of the first plurality of resolution paths; and the second polygon comprises a second size corresponding to a second number of the fourth plurality of resolution paths.

6. The apparatus of claim 4, wherein:

the visual communication rendering comprising the area comprises a plurality of polygons;

the plurality of polygons comprises a first polygon corresponding to the first location and a second polygon corresponding to the second location;

the first polygon comprises a first color corresponding to a first number of the first plurality of resolution paths; and the second polygon comprises a second color corresponding to a second number of the fourth plurality of resolution paths.

7. The apparatus of claim 4, wherein the processor is further configured to:

generate a plurality of information elements configured to influence modification of cell site construction in the area; and broadcast the plurality of information elements to a plurality of communication devices in the communication network.

8. The apparatus of claim 4, wherein the processor is further configured to:

generate a plurality of information elements configured to inform presence of cell site interruptions in the area; and broadcast the plurality of information elements to a plurality of communication devices in the communication network.

9. A method, comprising:

receiving first internal data associated with a first communication device, the first internal data referencing a first plurality of telemetry data in the first communication device;

receiving a first system communication from the first communication device, the first system communication referencing a first plurality of discrepancies in a first plurality of communication operations performed by the first communication device;

determining one or more first connections between the first plurality of telemetry data and the first plurality of discrepancies;

in response to determining the one or more first connections between the first plurality of telemetry data and the first plurality of discrepancies, evaluating the one or more first connections in accordance with a first plurality of communication conditions to determine a first plurality of modifications for a first access communication, at each modification in the first access communication, each of the first plurality of telemetry data being matched to one or more discrepancies of the first plurality of discrepancies;

generating the first access communication comprising the first plurality of modifications;

determining a first plurality of resolution paths for each modification of the first plurality of modifications, each resolution path comprising one or more modification commands configured to modify configuration data in the first communication device; and transmitting the first plurality of resolution paths to the first communication device.

10. The method of claim 9, further comprising:

determining first location information associated with the first communication device; and associating the first location information to the first access communication, wherein:

the first plurality of communication conditions is determined to impact the first plurality of communication operations in a first location associated with the first location information.

11. The method of claim 10, further comprising:

receiving second internal data associated with a second communication device, the second internal data referencing a second plurality of telemetry data in the second communication device;

receiving a second system communication from the second communication device, the second system communication referencing a second plurality of discrepancies in a second plurality of communication operations performed by the second communication device;

determining one or more second connections between the second plurality of telemetry data and the second plurality of discrepancies;

determining second location information associated with the second communication device;

in response to determining the one or more second connections between the second plurality of telemetry data and the second plurality of discrepancies, evaluating the one or more second connections in accordance with a second plurality of communication conditions to determine a second plurality of modifications for a second access communication, wherein:

the second plurality of communication conditions are determined to impact the second plurality of communication operations in a second location matching the second location information; and the second plurality of modifications comprising one or more of the second plurality of telemetry data matched to one or more of the second plurality of discrepancies;

associating the second location information to the second access communication;

generating the second access communication comprising the second plurality of modifications;

receiving third internal data associated with a third communication device, the third internal data referencing a third plurality of telemetry data in the third communication device;

receiving a third system communication from the third communication device, the third system communication referencing a third plurality of discrepancies in a third plurality of communication operations performed by the third communication device;

determining one or more third connections between the third plurality of telemetry data and the third plurality of discrepancies;

determining third location information associated with the third communication device;

in response to determining the one or more third connections between the third plurality of telemetry data and the third plurality of discrepancies, evaluating the one or more third connections in accordance with a third plurality of communication conditions to determine a third plurality of modifications for a third access communication, wherein:

the third plurality of communication conditions are determined to impact the third plurality of communication operations in a third location matching the third location information; and the third plurality of modifications comprising one or more of the third plurality of telemetry data matched to one or more of the third plurality of discrepancies;

associating the third location information to the third access communication;

generating the third access communication comprising the third plurality of modifications;

determining whether the second location information associated with the second access communication matches the third location information associated with the third access communication;

in response to determining that the second location information associated with the second access communication matches the third location information associated with the third access communication, determining a second plurality of resolution paths for each modification of the second plurality of modifications and a third plurality of resolution paths for each modification of the third plurality of modifications;

determining whether the second plurality of resolution paths matches the third plurality of resolution paths;

generating a fourth plurality of resolution paths based on the second plurality of resolution paths that match the third plurality of resolution paths; and transmitting the fourth plurality of resolution paths to the second communication device and the third communication device.

12. The method of claim 11, further comprising:

generating a visual communication rendering comprising an area comprising the first location associated with the first location information and the second location associated with the second location information; and presenting the visual communication rendering comprising the area to one or more communication devices.

13. The method of claim 12, wherein:

the visual communication rendering comprising the area comprises a plurality of polygons;

the plurality of polygons comprises a first polygon corresponding to the first location and a second polygon corresponding to the second location;

the first polygon comprises a first size corresponding to a first number of the first plurality of resolution paths; and the second polygon comprises a second size corresponding to a second number of the fourth plurality of resolution paths.

14. The method of claim 12, wherein:

the visual communication rendering comprising the area comprises a plurality of polygons;

the plurality of polygons comprises a first polygon corresponding to the first location and a second polygon corresponding to the second location;

the first polygon comprises a first color corresponding to a first number of the first plurality of resolution paths; and the second polygon comprises a second color corresponding to a second number of the fourth plurality of resolution paths.

15. The method of claim 12, further comprising:

generating a plurality of information elements configured to influence modification of cell site construction in the area; and broadcasting the plurality of information elements to a plurality of communication devices in a communication network.

16. A non-transitory computer-readable medium storing instructions that when executed by a processor cause the processor to:

receive first internal data associated with a first communication device, the first internal data referencing a first plurality of telemetry data in the first communication device;

receive a first system communication from the first communication device, the first system communication referencing a first plurality of discrepancies in a first plurality of communication operations performed by the first communication device;

determine one or more first connections between the first plurality of telemetry data and the first plurality of discrepancies;

in response to determining the one or more first connections between the first plurality of telemetry data and the first plurality of discrepancies, evaluate the one or more first connections in accordance with a first plurality of communication conditions to determine a first plurality of modifications for a first access communication, at each modification in the first access communication, each of the first plurality of telemetry data being matched to one or more discrepancies of the first plurality of discrepancies;

generate the first access communication comprising the first plurality of modifications;

determine a first plurality of resolution paths for each modification of the first plurality of modifications, each resolution path comprising one or more modification commands configured to modify configuration data in the first communication device; and transmit the first plurality of resolution paths to the first communication device.

17. The non-transitory computer-readable medium of claim 16, wherein the instructions further cause the processor to:

determine first location information associated with the first communication device; and associate the first location information to the first access communication, wherein:

the first plurality of communication conditions is determined to impact the first plurality of communication operations in a first location associated with the first location information.

18. The non-transitory computer-readable medium of claim 17, wherein the instructions further cause the processor to:

receive second internal data associated with a second communication device, the second internal data referencing a second plurality of telemetry data in the second communication device;

receive a second system communication from the second communication device, the second system communication referencing a second plurality of discrepancies in a second plurality of communication operations performed by the second communication device;

determine one or more second connections between the second plurality of telemetry data and the second plurality of discrepancies;

determine second location information associated with the second communication device;

in response to determining the one or more second connections between the second plurality of telemetry data and the second plurality of discrepancies, evaluate the one or more second connections in accordance with a second plurality of communication conditions to determine a second plurality of modifications for a second access communication, wherein:

the second plurality of communication conditions are determined to impact the second plurality of communication operations in a second location matching the second location information; and the second plurality of modifications comprising one or more of the second plurality of telemetry data matched to one or more of the second plurality of discrepancies;

associate the second location information to the second access communication;

generate the second access communication comprising the second plurality of modifications;

receive third internal data associated with a third communication device, the third internal data referencing a third plurality of telemetry data in the third communication device;

receive a third system communication from the third communication device, the third system communication referencing a third plurality of discrepancies in a third plurality of communication operations performed by the third communication device;

determine one or more third connections between the third plurality of telemetry data and the third plurality of discrepancies;

determine third location information associated with the third communication device;

in response to determining the one or more third connections between the third plurality of telemetry data and the third plurality of discrepancies, evaluate the one or more third connections in accordance with a third plurality of communication conditions to determine a third plurality of modifications for a third access communication, wherein:

the third plurality of communication conditions are determined to impact the third plurality of communication operations in a third location matching the third location information; and the third plurality of modifications comprising one or more of the third plurality of telemetry data matched to one or more of the third plurality of discrepancies;

associate the third location information to the third access communication;

generate the third access communication comprising the third plurality of modifications;

determine whether the second location information associated with the second access communication matches the third location information associated with the third access communication;

in response to determining that the second location information associated with the second access communication matches the third location information associated with the third access communication, determine a second plurality of resolution paths for each modification of the second plurality of modifications and a third plurality of resolution paths for each modification of the third plurality of modifications;

determine whether the second plurality of resolution paths matches the third plurality of resolution paths;

generate a fourth plurality of resolution paths based on the second plurality of resolution paths that match the third plurality of resolution paths; and transmit the fourth plurality of resolution paths to the second communication device and the third communication device.

19. The non-transitory computer-readable medium of claim 18, wherein the instructions further cause the processor to:

generating a visual communication rendering comprising an area comprising the first location associated with the first location information and the second location associated with the second location information; and presenting the visual communication rendering comprising the area to one or more communication devices.

20. The non-transitory computer-readable medium of claim 19, wherein:

the visual communication rendering comprising the area comprises a plurality of polygons;

the plurality of polygons comprises a first polygon corresponding to the first location and a second polygon corresponding to the second location;

the first polygon comprises a first size corresponding to a first number of the first plurality of resolution paths; and the second polygon comprises a second size corresponding to a second number of the fourth plurality of resolution paths.

* * * * *